Oct. 23, 1962  H. STAATS ET AL  3,059,508
POLYGONAL CUTTER

Filed Sept. 27, 1961  2 Sheets-Sheet 1

INVENTORS
Herbert Staats
Albert Vayton

Oct. 23, 1962  H. STAATS ET AL  3,059,508
POLYGONAL CUTTER

Filed Sept. 27, 1961  2 Sheets-Sheet 2

INVENTORS
Herbert Staats
Albert Taylor

United States Patent Office 3,059,508
Patented Oct. 23, 1962

3,059,508
POLYGONAL CUTTER
Herbert Staats and Albert Payton, both % Canadian Research & Development Foundation, 1434 Queen St. W., Toronto 3, Ontario, Canada
Filed Sept. 27, 1961, Ser. No. 141,212
3 Claims. (Cl. 77—61)

This invention relates to improvements in machine tools and more particularly to improvements in cutting tools utilized for the purpose of boring polygonal holes and adapted for use in such machines as drill presses, lathes, boring mills and the like.

In order to produce a polygonal hole through a piece of material such as sheet steel, it is conventional practice to utilize methods whereby such cutting tools are drills, counterbores, and broaches are employed, in that order, such practice having the advantage that many costly machines and several time consuming operations are required. A variety of expensive, automatic and semi-automatic machines are also available for this purpose, but their operations are confined to cutting either, internal or external holes and are seldom capable of performing both operations.

The most widely used methods of forming internal polygonal holes is by broaching; while extruding or cold heading is the preferred method for forming external multi-sided configurations; these methods having the disadvantage that widely different forms of machinery are required, demanding an equally wide range of machine programming.

It is an object of the present invention to provide a polygonal cutter which will cut a polygonal hole through sheet steel, aluminum or the like, in one operation and utilizing only one tool.

It is a further object of the present invention to provide a polygonal cutter which will form the exterior of bar material into a desired multi-sided configuration in one operation and utilizing only one tool.

It is yet another object of the invention to provide a polygonal cutter which will perform both of the above operations with only minor modification being required.

It is still another object of the invention to provide a polygonal cutter which may be driven by any of the rotating machinery common to a workshop, such as, for instance, a lathe, drill press or the like.

It is, therefore, a still further object of the invention to provide a polygonal cutter which will eliminate the costly machinery of devices of the prior art and further save time by cutting down on the number of machining operations which have been heretofore required.

These and other objects and features of this invention will become apparent when taken in conjunction with the accompanying drawings in which.

Figure 1:
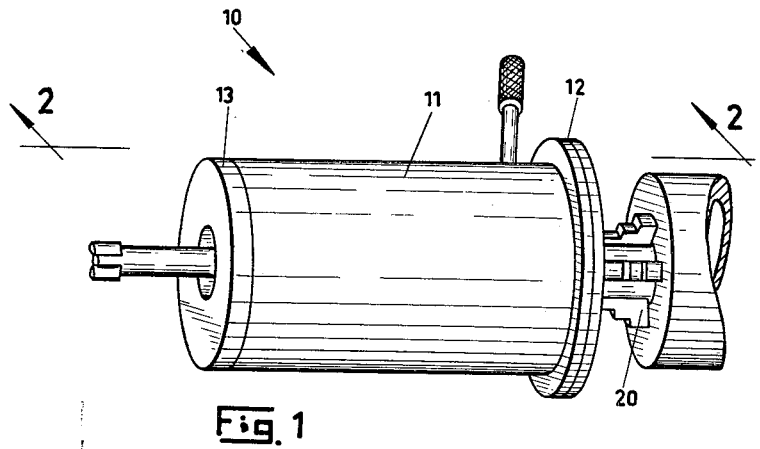
FIG. 1 is a perspective view of a polygonal cutter embodying the present invention, shown installed in the chuck of a conventional lathe.
Figure 2:
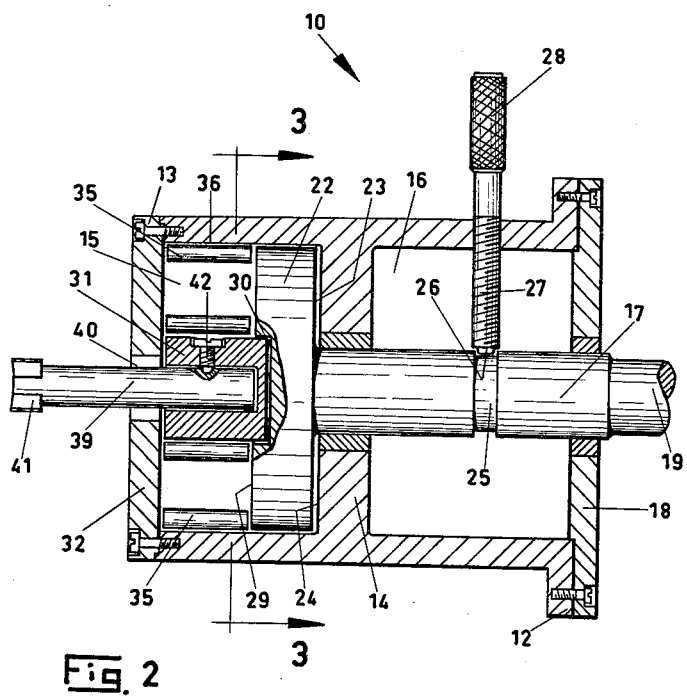
FIG. 2 is a mid-vertical, sectional, side elevation of the cutter illustrated in FIG. 1, taken on the line 2—2.
Figure 3:
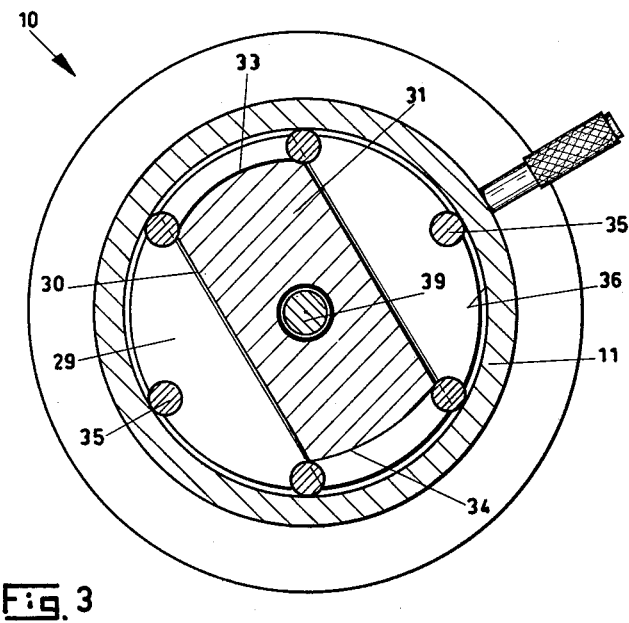
FIG. 3 is a transverse cross section of the cutter, taken on the line 3—3 of FIG. 2, to illustrate the cam and tool holder mechanism of the invention.

Referring to FIGS. 1, 2 and 3, a polygonal cutter 10 includes a cylindrical body member 11 supporting a flange 12 at the rear end thereof and having an open front end 13.

A transverse centre wall 14 divides body member 11 into a front cavity 15 and a rear cavity 16, and is centrally apertured and bushed to support an axial drive shaft 17. A rear plate 18 is similarly apertured and bushed to support shaft 17 and is attached by conventional nut and bolt means or the like to flange 12 of body member 11.

The rearmost portion 19 of shaft 17 extends rearwardly of plate 18 for attachment to suitable drive means such as a lathe chuck 20 or the like.

The forward portion 21 of shaft 17 is integral with a cam driving disc 22. Disc 22 is housed within cavity 15, its rear surface 23 being adjacent to but spaced apart from the front surface 24 of wall 14, and has sufficient peripheral clearance within body member 11 to permit its free rotation therein.

A circumferential groove 25 formed substantially centrally in shaft 17 and located within rear cavity 16 of body member 11 is adapted to mate with a smooth, hardened end 26 of a threaded bar 27. Bar 27 is adapted to screw radially into cavity 16 where its end 26, by mating with groove 25 of shaft 17 in a sliding fit, restrains shaft 17 from axial travel while permitting free rotation thereof.

Bar 27 also extends radially outwardly from body 11 to terminate in a conventional knurled end 28 which is utilized as a steady arm, preventing rotation of body member 11 during operation of cutter 10.

The front surface 29 of disc 22 carries a wide, diametrical channel 30 for the closely slidable support of a parallel-sided cam plate 31.

Cam plate 31 extends forwardly from disc 22 and is restricted from forward travel by a front plate 32 attached by conventional means to the front edge 13 of body member 11.

Referring specifically to FIG. 3, cam plate 31 has two arcuate ends 33 and 34, the radius of end 33 being smaller than that of end 34. The centre of end 33 falling inside cam plate 31 and the centre of end 34 falling outside cam plate 31. Neither of these centres coincide with the centre of cam plate 31.

A plurality of axial pins 35 are equi-spaced around the inner surface 36 of body member 11 at the forward end of front cavity 15, and are parallel with the axis of body member 11.

The number of pins 35 herein illustrated and described is six but this is not intended to limit the scope of the invention in which any number of pins 35 may be used to produce various sided polygons.

Figure 4:
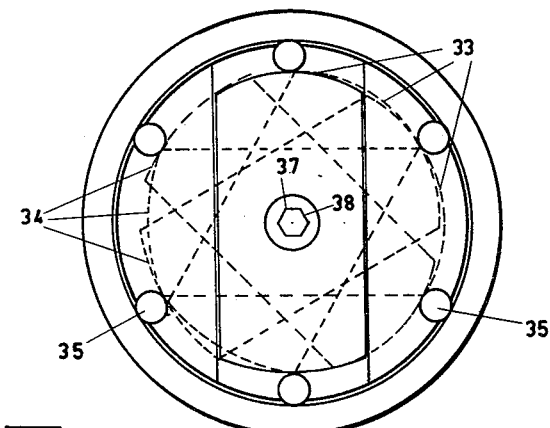
FIG. 4 is a diagrammatic sketch of the cam mechanism illustrated in FIG. 3, showing the action of the cam plate and the path of its centre durign one revolution.

Referring to FIGS. 2, 3 and 4, it will be seen that rotation of shaft 17 causes drive disc 22 to rotate, and, through channel 30, cam plate 31 is also caused to rotate in a plane normal to the axis of shaft 17.

Both ends 33 and 34 are eccentric with the circle tangential with pins 35 so that rotation of cam plate 31 and movement of arcuate ends 33 and 34 over pins 35 cause cam plate 31 to travel diametrically within channel 30. This linear movement coupled with its rotation causes a centre point 37 to move in a series of straight lines 38. It will be noted that line 38 changes directions at the point where ends 33 and 34 are midway between two pairs of pins 35, so that by utilizing six pins 35 as herein illustrated, centre point 37 moves through a regular hexagonal path.

This movement is transmitted from cam plate 31 forwardly by means of a cutter bar 39, adapted to pass through a clearance hole 40 in front end plate 32, a conventional cutter head 41 terminating bar 39 for the final machining action of cutter 10. Bar 39 is a socket fit in cam plate 31 and is releasably retained therein by a grub screw 42 or other conventional means, so that a cutter bar 39 may be changed at will.

It should be noted that the final action transmitted to cutter head 41 is both rotational and linear—the former permitting cutting action and the latter causing head 41 to move in a polygonal path as delineated by line 38.

This action may be utilized both internally for the forming of polygonal holes, and externally for the shaping of bars, sheet mataerial or the like into polygonal forms.

The general design of the individual parts of the invention as explained above may be varied according to the requirements in regard to manufacture and production thereof, while still remaining within the spirit and principle of the invention, without prejudicing the novelty thereof.

The embodiments of this invention in which an exclusive property or privilege is claimed are defined as follows:

1. A polygonal cutter including a body member; a cam plate within said body member; said cam plate having a first arcuate end and a second arcuate end, the radius of said first end being smaller than the radius of said second end, drive means for the rotation of said cam plate; guide means for the deflection of said cam plate from a fully circular path; interconnecting means between said drive means and said cam plate permitting restricted lineal travel of said cam plate during the rotation thereof, and means actuated by said cam plate for machining material.

2. A polygonal cutter as defined in claim 1 in which said guide means includes a plurality of pins equi-distantly spaced around the circumference of a circle concentric with said drive means; said ends of said cam plate being in tangential contact with said pins consecutively during rotation of said cam plate.

3. A polygonal cutter including a cylindrical body member; a transverse wall within said body member and front and rear end walls detachably attached to said body member; a driving disc within said body member rotatable in a plane normal to the axis of said body member; a drive shaft extending from said driving disc through said transverse and rear walls, said transverse and rear walls being suitably apertured and bushed to permit free rotation of said shaft; said driving disc having a diametrical channel formed therein; a cam plate slidable within said channel; said cam plate including a first arcuate end and a second arcuate end the radius of said first arcuate end being smaller than the radius of said second arcuate end; guide means including a plurality of axially aligned pins, equi-distantly spaced around the interior surface of said body member coplanar with said cam plate; said arcuate ends of said cam plate being in tangential contact with at least two oppositely located pins during rotation of said cam plate and in consecutive tangential contact with all of said pins during one revolution of said driving disc; a cutter bar extending forwardly through said front end wall of said body member, said front end wall having an aperture therethrough to permit said cutter bar to move freely; said cutter bar being detachably attached to said cam plate; and a steady bar cooperable with a groove in said drive shaft to limit axial travel of said drive shaft and extending outwardly of said body member to prevent rotation thereof.

References Cited in the file of this patent
UNITED STATES PATENTS
485,233     Smith _____ Nov. 1, 1892